(12) United States Patent
Goh et al.

(10) Patent No.: US 12,492,666 B2
(45) Date of Patent: Dec. 9, 2025

(54) CONTROL DEVICE FOR ENGINE

(71) Applicant: TOYOTA JIDOSHA KABUSHIKI KAISHA, Toyota (JP)

(72) Inventors: Reiko Goh, Toyota (JP); Masanao Idogawa, Nagoya (JP); Takahiro Uchida, Okazaki (JP); Masahiro Kachi, Nagakute (JP); Seiji Hirowatari, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/955,194

(22) Filed: Nov. 21, 2024

(65) Prior Publication Data
US 2025/0230775 A1 Jul. 17, 2025

(30) Foreign Application Priority Data
Jan. 17, 2024 (JP) ................. 2024-005451

(51) Int. Cl.
*F02D 31/00* (2006.01)
*G07C 5/08* (2006.01)

(52) U.S. Cl.
CPC ......... *F02D 31/001* (2013.01); *G07C 5/0825* (2013.01); *F02D 2200/021* (2013.01); *F02D 2200/101* (2013.01)

(58) Field of Classification Search
CPC ............ F02D 31/001; F02D 2200/021; F02D 2200/101; F02D 2200/60; F02D 2200/606; F02D 2200/701; F02D 2200/702; G07C 5/0825; B60W 50/00
See application file for complete search history.

(56) References Cited

U.S. PATENT DOCUMENTS

| 5,422,625 | A | * | 6/1995 | Sakaemura | ............. | B60Q 1/54 |
| | | | | | | 340/459 |
| 2009/0240396 | A1 | * | 9/2009 | Sullivan | ................. | B60K 35/22 |
| | | | | | | 116/286 |

FOREIGN PATENT DOCUMENTS

| JP | 2004-207782 A | 7/2004 | | |
| WO | WO-02092394 A1 | * | 11/2002 | ............. B60K 35/20 |

* cited by examiner

*Primary Examiner* — Hung Q Nguyen
(74) *Attorney, Agent, or Firm* — Oliff PLC

(57) ABSTRACT

A control device, for an engine provided in a vehicle, is configured to change a rotation speed limit value for the engine from a first rotation speed limit value to a second rotation speed limit value higher than the first rotation speed limit value, when a circuit mode is selected as a driving mode of the vehicle, and the control device is configured to transmit first meter display control information to a meter control device controlling a display device provided in a vehicle cabin of the vehicle on a basis of the second rotation speed limit value.

4 Claims, 4 Drawing Sheets

CONTROL DEVICE FOR ENGINE

CROSS-REFERENCE TO RELATED APPLICATION

This application is based upon and claims the benefit of priority of the prior Japanese Patent Application No. 2024-005451, filed on Jan. 17, 2024, the entire contents of which are incorporated herein by reference.

TECHNICAL FIELD

The present disclosure relates to a control device for an engine.

BACKGROUND

As more and more people are engaged in sports driving on circuits, etc., there are more and more opportunities to drive at speeds above the vehicle speed limit, and sports driving with the speed limiter deactivated is being conducted (see, for example, Japanese Unexamined Patent Application Publication No. 2004-207782).

When a vehicle is driven at a speed equal to or higher than a speed limit of the vehicle on a closed course such as a circuit, a driver of the vehicle may select a circuit mode as a driving mode of the vehicle. When the circuit mode is selected, the engine is controlled to a driving mode suitable for driving on closed courses.

However, even when the circuit mode is selected, for example, a meter display of a display device provided in a vehicle cabin of the vehicle may be maintained in a state where a normal driving mode is set. In this case, the driver might misunderstand that the circuit mode is not selected.

SUMMARY

It is therefore an object of the present disclosure to provide a control device, for an engine, controlling an operating state of a vehicle so as to correspond to a circuit mode.

The above object is achieved by a control device for an engine provided in a vehicle, wherein the control device is configured to change a rotation speed limit value for the engine from a first rotation speed limit value to a second rotation speed limit value higher than the first rotation speed limit value, when a circuit mode is selected as a driving mode of the vehicle, the control device is configured to transmit first meter display control information to a meter control device controlling a display device provided in a vehicle cabin of the vehicle on a basis of the second rotation speed limit value, the first meter display control information is information for changing a boundary rotation speed from a first boundary rotation speed to a second boundary rotation speed higher than the first boundary rotation speed, the boundary rotation speed is a speed between a first meter display region and a second meter display region on a high rotation speed side adjacent to the first meter display region, and the first and second meter display regions indicate a rotation speed of the engine.

The control device may be configured to execute a process of subtracting a predetermined value from the second rotation speed limit value, the predetermined value may be a value for suppressing a rapid change from the first boundary rotation speed to the second boundary rotation speed, and the control device may be configured to transmit the first meter display control information on a basis of a predetermined rotation speed limit value obtained by subtracting the predetermined value from the second rotation speed limit value.

The control device may be configured to change the rotation speed limit value from the second rotation speed limit value to the first rotation speed limit value, when the circuit mode is cancelled, the control device may be configured to transmit second meter display control information to the meter control device on a basis of the first rotation speed limit value, and the second meter display control information may be information for changing the boundary rotation speed from the second boundary rotation speed to the first boundary rotation speed.

When a temperature of a coolant for cooling the engine is lower than a threshold temperature, the control device may be configured to select a third rotation speed limit value lower than the first rotation speed limit value, to limit the rotation speed of the engine in a cold state on a basis of the third rotation speed limit value, and to transmit third meter display control information to the meter control device, and the third meter display control information may be information for changing the boundary rotation speed from the first boundary rotation speed to a third boundary rotation speed lower than the first boundary rotation speed.

DETAILED DESCRIPTION

Hereinafter, embodiments of the present disclosure will be described with reference to the drawings.

Figure 1:
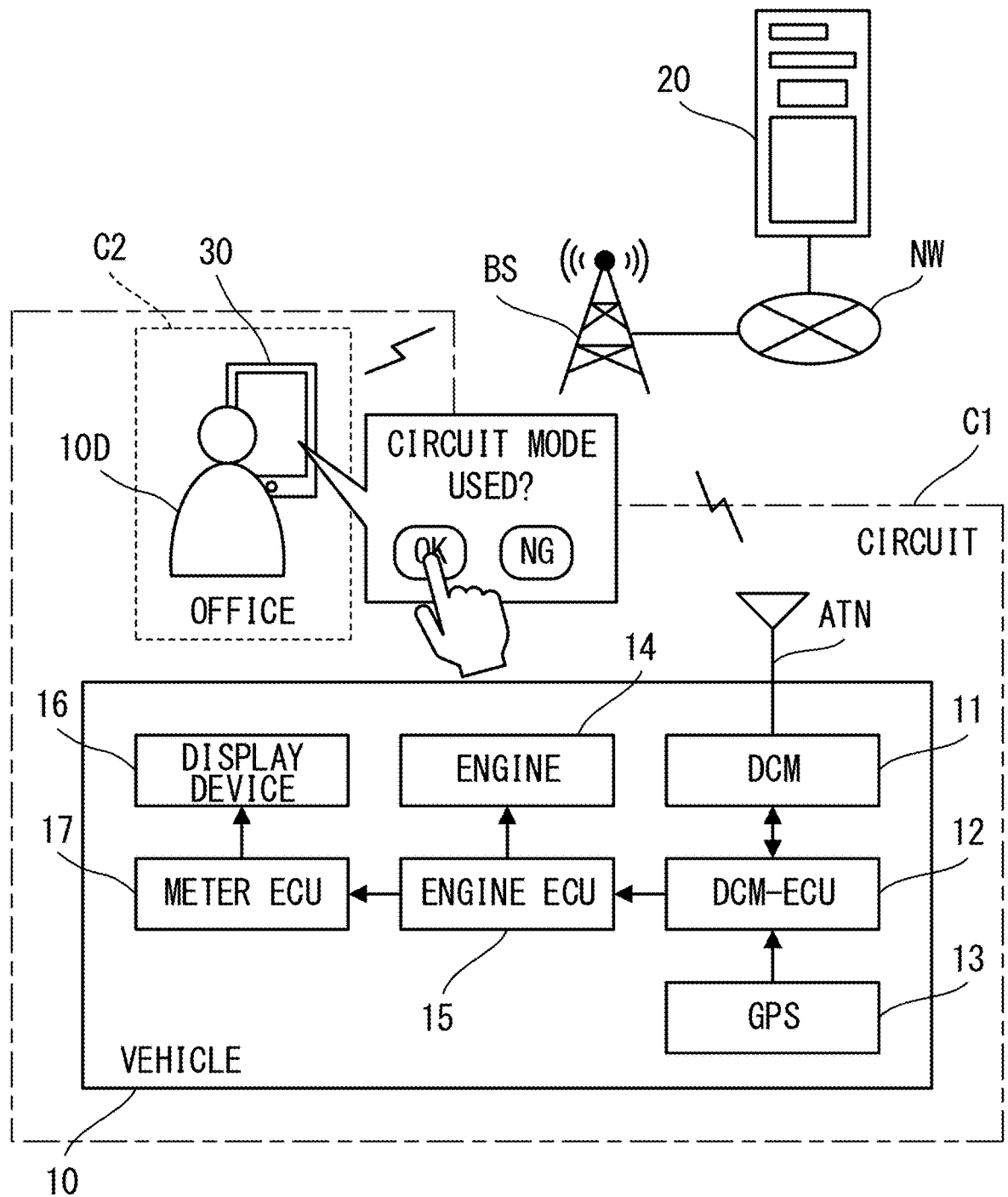
FIG. 1 is a view illustrating an example of a service providing system.

As illustrated in FIG. 1, a service providing system ST includes a vehicle 10, a server 20, and a portable terminal 30. Although a smartphone is illustrated as an example of the portable terminal 30 in FIG. 1, a tablet terminal may be used instead of the smartphone. The service providing system ST provides a driver 10D of the vehicle 10 with a service limited to a circuit C1 by cooperation of the vehicle 10, the server 20, and the portable terminal 30.

For example, when the vehicle 10 enters the circuit C1 and the driver 10D operates the portable terminal 30 in a circuit office C2 of the circuit C1 to select the circuit mode, the portable terminal 30 acquires position information of the vehicle 10 via the server 20. The vehicle 10 includes a data communication module (DCM) 11 as a wireless communication device to which an antenna ATN is connected, a DCM-electronic control unit (ECU) 12, and a global positioning system (GPS) 13. The DCM-ECU 12 is a hardware circuit including a central processing unit (CPU), a random access memory (RAM), a read only memory (ROM), an input/output interface (I/F), and the like.

The GPS 13 measures a position of the vehicle 10 and holds position information indicating the measured position. The DCM-ECU 12 acquires position information from the GPS 13 and transmits the position information to the server 20 via the DCM 11 and the antenna ATN. Therefore, when the server 20 requests the vehicle 10 to transmit the position information, the server 20 acquires the position information from the vehicle 10. The position information reaches the server 20 via a base station BS and a communication network NW. The communication network NW includes one or both of the Internet and a local area network (LAN). When the server 20 acquires the position information, the server 20 transfers the position information to the portable terminal 30 via the communication network NW and the base station BS. Thus, the portable terminal 30 acquires the position information of the vehicle 10.

The portable terminal 30 includes map information, and determine whether or not a present position of the vehicle 10 is within the circuit C1, on the basis of the map information and the position information. When the vehicle 10 is not in the circuit C1, the portable terminal 30 rejects a shift to the circuit mode and presents the rejection to the driver 10D on a screen. On the other hand, when the position of the vehicle 10 is within the circuit C1, the portable terminal 30 presents the driver 10D with a notice due to the shift to the circuit mode and requests the driver 10D to permit the shift. In this way, as for the shift to the circuit mode, it is determined whether or not the position of the vehicle 10 is within the circuit C1 based on the map information and the position information. Therefore, the circuit mode is different from a sport mode (or a sport driving mode) in which a driving performance is improved only by switching a switch without executing the above determination. When the portable terminal 30 receives the permission for the shift from the driver 10D, the portable terminal 30 notifies the server 20 of the permission for the shift.

When the permission of the shift to the circuit mode is notified from the portable terminal 30, the server 20 generates instruction information for instructing the shift to the circuit mode and transmits the instruction information to the vehicle 10. In the vehicle 10, the DCM-ECU 12 receives the instruction information from the server 20 via the DCM 11 and the antenna ATN. The vehicle 10 includes an engine 14, an engine ECU 15, a display device 16, and a meter ECU 17. The display device 16 is provided in a vehicle cabin of the vehicle 10. Hardware configurations of the engine ECU 15 and the meter ECU 17 are basically the same as that of the DCM-ECU 12, and thus detailed description thereof will be omitted.

When the DCM-ECU 12 receives the instruction information, the DCM-ECU 12 transmits the received instruction information to the engine ECU 15. When the engine ECU 15 receives the instruction information, the engine ECU 15 changes the control of the engine 14 based on the instruction information. For example, the engine ECU 15 changes a control map from a control map corresponding to the normal driving mode to the control map corresponding to the circuit mode based on the instruction information. Thus, the engine 14 is operated in the circuit mode, for example, in which the engine rotation speed is increased to a high rotation speed. In this way, the driving performance of the vehicle 10 is improved in the circuit mode as compared with the normal driving mode.

When the engine ECU 15 changes the control of the engine 14, the engine ECU 15 sends meter display control information to the meter ECU 17. The meter display control information is information for controlling the display of the tachometer provided in the display device 16. For example, when the engine ECU 15 changes the control map, the engine ECU 15 generates the meter display control information and transmits the meter display control information to the meter ECU 17. The meter ECU 17 controls the display of the tachometer based on the meter display control information. When the circuit mode is selected, a boundary rotation speed is increased. The boundary rotation speed is a speed between a first meter display region and a second meter display region on a high rotation speed side adjacent to the first meter display region. The first and second meter display regions indicate a rotation speed of the engine 14.

Thus, the meter display is shifted from the normal driving mode to the circuit mode. As a result, the driver 10D recognizes that the circuit mode is selected. In this way, by selecting the circuit mode, the service providing system ST provides the driver 10D with a service that conveys the enjoyment of motor sports.

The operation of the engine ECU 15 will be described with reference to FIGS. 2 to 4C.

Figure 2:
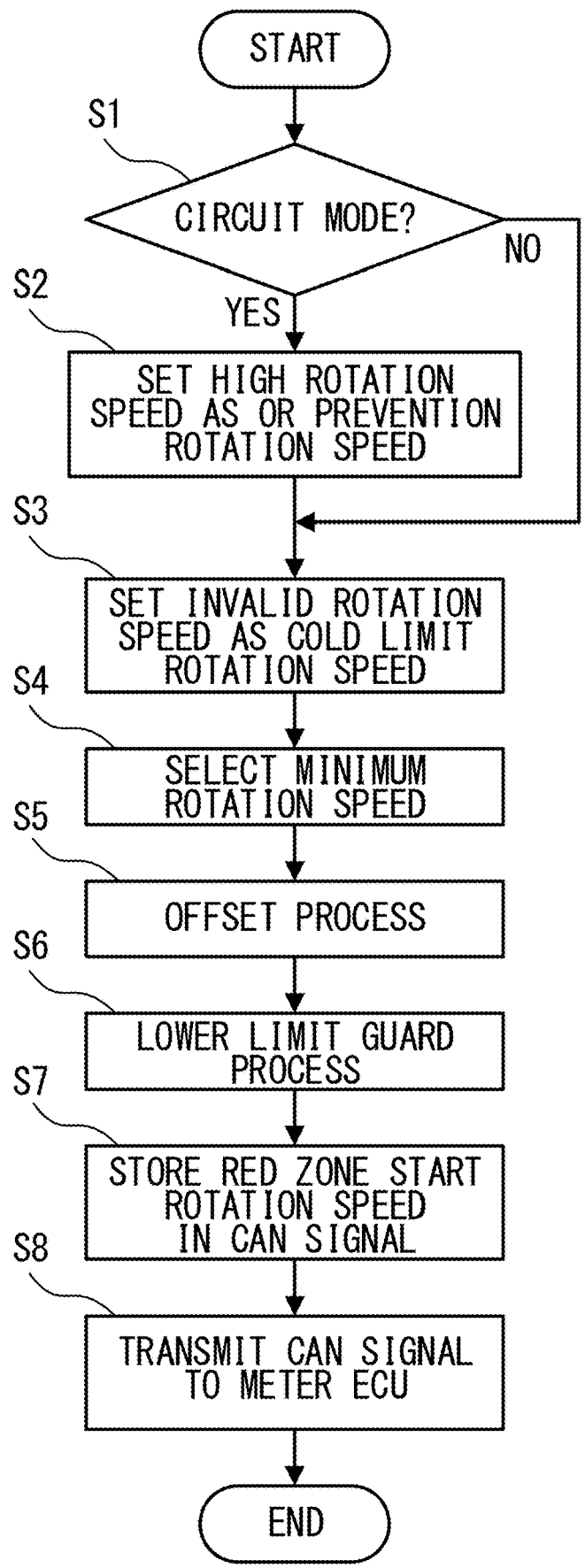
FIG. 2 is a flowchart illustrating an example of an operation of an engine ECU.

First, as illustrated in FIG. 2, the engine ECU 15 determines whether or not the circuit mode is selected as the driving mode of the vehicle 10 (step S1). If the circuit mode is selected (step S1: YES), the engine ECU 15 sets a high rotation speed as an over Run (OR) prevention rotation speed (step S2). For example, the OR prevention rotation speed may be set to a first rotation speed limit value such as 6600 rpm or 7200 rpm as the normal driving mode. The first rotation speed limit value is a rotation speed limit value that ensures the durability of the engine 14.

In this case, the engine ECU 15 sets a second rotation speed limit value to, for example, 7400 rpm, as the OR prevention rotation speed. In this way, the second rotation speed limit value that is higher than the first rotation speed limit value is set as the OR prevention rotation speed. When the second rotation speed limit value is set, the durability of the engine 14 is slightly reduced, but the frequency of upshifting is reduced, and the time loss is reduced. In this way, the driving performance peculiar to the circuit mode is ensured. The fact that the durability of the engine 14 is slightly reduced is alerted to the driver 10D in advance as a notification as described above. On the other hand, when the circuit mode is not selected (step S1: NO), the engine ECU 15 skips the process of step S2. Therefore, in this case, the first rotation speed limit value set in advance as the OR prevention rotation speed is maintained.

Next, the engine ECU 15 sets a cold limit rotation speed to an invalid rotation speed (step S3). The cold limit rotation speed is a limit rotation speed for protecting the engine 14 from thermal distortion. For example, when the temperature rise gradient is large in a cold state in which a coolant temperature of the engine 14 is low, thermal strain might occur in the engine 14. For this reason, a third rotation speed limit value, for example, 4400 rpm, is set in advance in the cold state. However, when the circuit mode is selected, the engine ECU 15 sets the cold limit rotation speed to the invalid speed of, for example, 12800 rpm, which is higher than the second rotation speed limit value. Thus, the setting of the third rotation speed limit value is substantially invalidated in subsequent processes.

Next, the engine ECU 15 selects the minimum rotation speed of the OR prevention rotation speed and the cold limit rotation speed (step S4). In the present embodiment, the second rotation speed limit value is set as the OR prevention rotation speed, and the invalid rotation speed is set as the cold limit rotation speed by selecting the circuit mode. Since the second rotation speed limit value is smaller than the invalid rotation speed, the engine ECU 15 selects the second rotation speed limit value.

Figure 3:
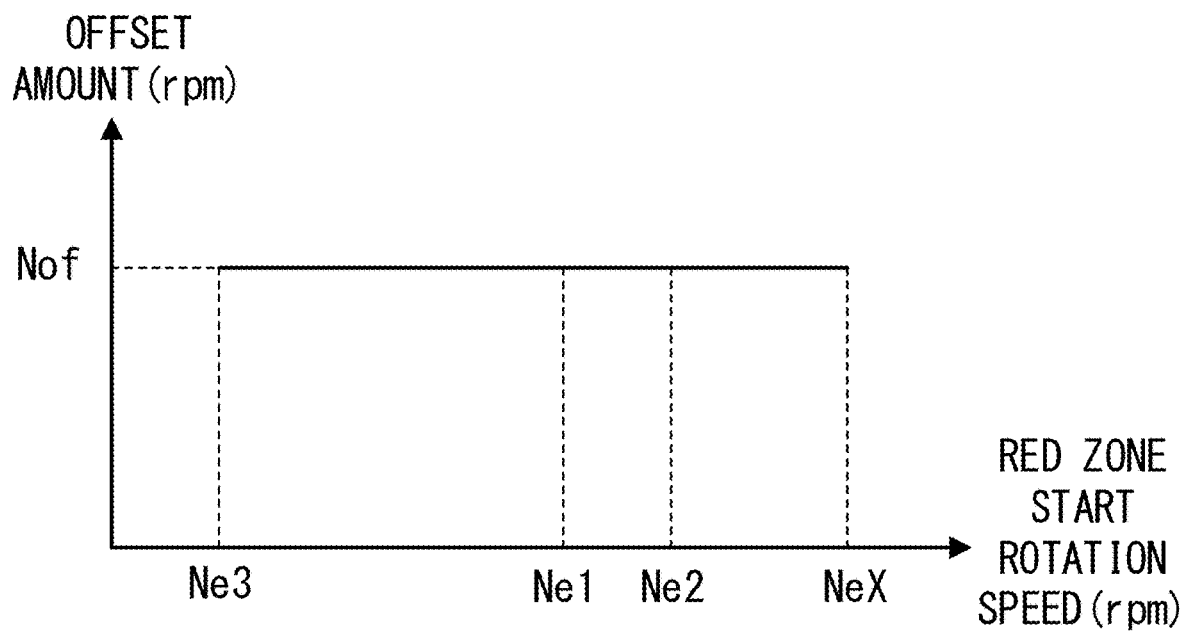
FIG. 3 is a view illustrating an example of a control map used in a offset process.

Next, the engine ECU 15 executes an offset process (step S5). Specifically, as illustrated in FIG. 3, the engine ECU 15 executes, as the offset process, a process for subtracting a predetermined value Nof such as 200 rpm from a second rotation speed limit value Ne2 based on the control map. FIG. 3 illustrates a first rotation speed limit value Ne1 smaller than the second rotation speed limit value Ne2, a third rotation speed limit value Ne3 smaller than the first rotation speed limit value Ne1, and an invalid rotation speed NeX higher than the second rotation speed limit value Ne2.

With such an offset process, a first boundary rotation speed, between a non-red zone indicating a range of the rotation speed of the engine 14 and a red zone on the high rotation speed side adjacent to the non-red zone, is prevented from being rapidly changed to a second boundary rotation speed. That is, a margin for avoiding a rapid change is ensured by the offset process. The red zone, which is an example of a second meter display region representing a range of an excessive engine rotation speed in which the engine load is large. Therefore, it is desirable that the engine rotation speed is within the range of the non-red zone which is an example of the first meter display region.

Next, the engine ECU 15 executes a lower limit guard process (step S6). For example, a lower limit guard process is executed to prevent the second rotation speed limit value Ne2 from being equal to or smaller than 0 (zero) rpm after the subtraction of the predetermined value Nof. Next, the engine ECU 15 stores a red zone start rotation speed in a CAN (Controller Area Network) signal (step S7). More specifically, the engine ECU 15 stores the second rotation speed limit value Ne2 after subtracting the predetermined value Nof as the red zone start rotation speed in the CAN signal. The CAN signal is an example of first meter display control information, and the red zone start rotation speed is an example of a predetermined rotation speed limit value.

Figure 4A:
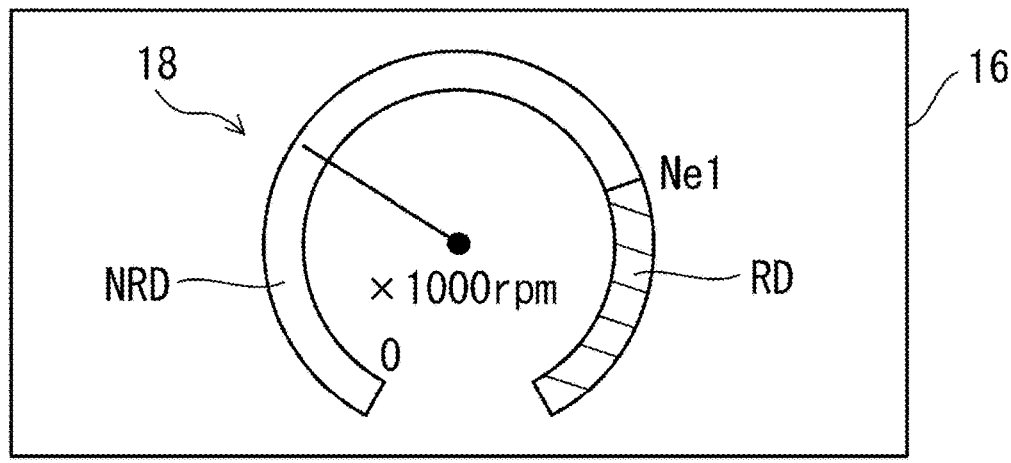
FIG. 4A is a view illustrating an example of a tachometer in a normal driving mode.

Next, the engine ECU 15 transmits the CAN signal to the meter ECU 17 (step S8), and then the control ends. Thus, the meter ECU 17 controls the display of the tachometer provided in the display device 16 based on the CAN signal. For example, as illustrated in FIG. 4A, in the normal driving mode, the boundary rotation speed between a non-red zone NRD and a red zone RD of a tachometer 18 may be set to the first rotation speed limit value Ne1.

Figure 4B:
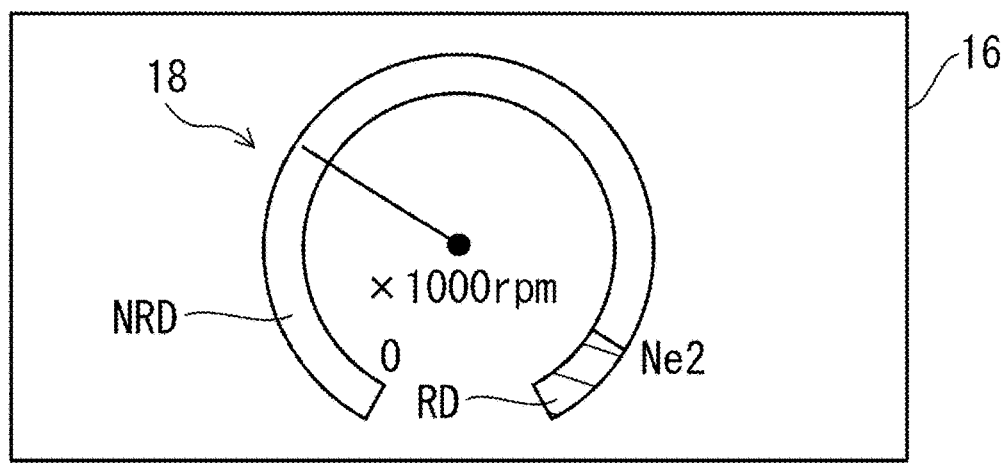
FIG. 4B is a view illustrating an example of a tachometer in a circuit mode.

In this case, when the circuit mode is selected, the boundary rotation speed between the non-red zone NRD and the red zone RD of the tachometer 18 is set to the second rotation speed limit value Ne2, as illustrated in FIG. 4B. That is, the engine ECU 15 changes the boundary rotation speed between the non-red zone NRD and the red zone RD to the high rotation speed side via the meter ECU 17. Thus, the driver 10D instantly confirms that the circuit mode is selected. In other words, the driver 10D does not misunderstand that the circuit mode is not selected.

On the other hand, when the circuit mode is cancelled, the engine ECU 15 changes the second rotation speed limit value Ne2 of the engine 14 to the first rotation speed limit value Ne1. Then, the engine ECU 15 transmits a CAN signal for lowering the boundary rotation speed to the meter ECU 17 on the basis of the first rotation speed limit value Ne1. The CAN signal for lowering the boundary rotation speed is an example of second meter display control information. As a result, the meter display of the tachometer 18 is switched from the state illustrated in FIG. 4B to the state illustrated in FIG. 4A. As a result, the driver 10D instantaneously confirms that the circuit mode is canceled.

When the temperature of the coolant for cooling the engine 14 is lower than the threshold temperature, the engine ECU 15 sets the third rotation speed limit value Ne1, which is lower than the first rotation speed limit value Ne3, as the cold state rotation speed limit in the process of step S3 described above. Thus, in the process of step S4 described above, the engine ECU 15 selects the third rotation speed limit value Ne3.

Figure 4C:
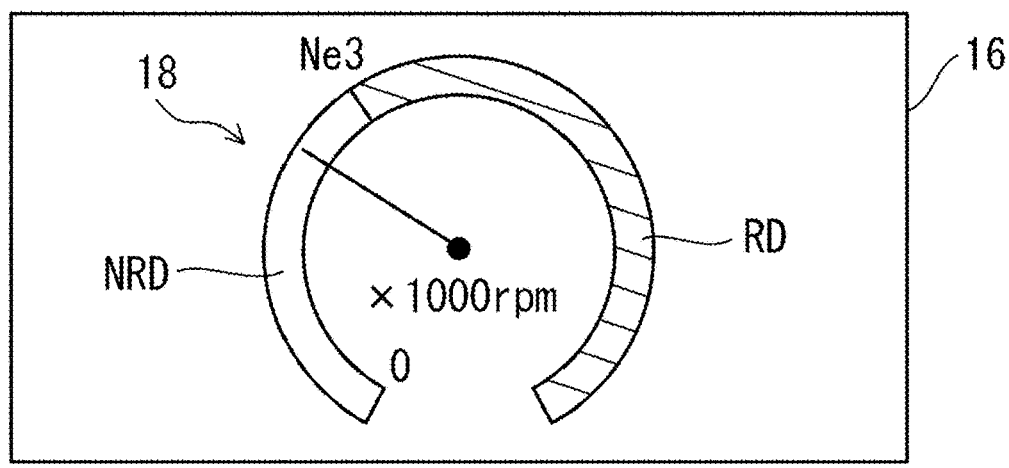
FIG. 4C is a view illustrating an example of a tachometer in a cold state.

The engine ECU 15 limits the rotation speed of the engine 14 in the cold state on the basis of the third rotation speed limit value Ne3, and transmits a CAN signal for lowering the boundary rotation speed to the meter ECU 17. The CAN signal for lowering the boundary rotation speed is an example of third meter display control information. As a result, as illustrated in FIG. 4C, in the cold state, the non-red zone NRD is reduced and the red zone RD is expanded as compared with the normal driving mode. As a result, the driver 10D pays attention to the fact that the accelerator operation is loosened so that the engine speed does not enter the red zone RD.

Although some embodiments of the present disclosure have been described in detail, the present disclosure is not limited to the specific embodiments but may be varied or changed within the scope of the present disclosure as claimed.

What is claimed is:

1. A control device for an engine provided in a vehicle, wherein
    the control device is configured to change a rotation speed limit value for the engine from a first rotation speed limit value to a second rotation speed limit value higher than the first rotation speed limit value, when a circuit mode is selected as a driving mode of the vehicle,
    the control device is configured to transmit first meter display control information to a meter control device controlling a display device provided in a vehicle cabin of the vehicle on a basis of the second rotation speed limit value,
    the first meter display control information is information for changing a boundary rotation speed from a first boundary rotation speed to a second boundary rotation speed higher than the first boundary rotation speed,
    the boundary rotation speed is a speed between a first meter display region and a second meter display region on a high rotation speed side adjacent to the first meter display region, and
    the first and second meter display regions indicate a rotation speed of the engine.

2. The control device for the engine according to claim 1, wherein
    the control device is configured to execute a process of subtracting a predetermined value from the second rotation speed limit value,
    the predetermined value is a value for suppressing a rapid change from the first boundary rotation speed to the second boundary rotation speed, and
    the control device is configured to transmit the first meter display control information on a basis of a predetermined rotation speed limit value obtained by subtracting the predetermined value from the second rotation speed limit value.

3. The control device for the engine according to claim 1, wherein
    the control device is configured to change the rotation speed limit value from the second rotation speed limit value to the first rotation speed limit value, when the circuit mode is cancelled,
    the control device is configured to transmit second meter display control information to the meter control device on a basis of the first rotation speed limit value, and the second meter display control information is information for changing the boundary rotation speed from the second boundary rotation speed to the first boundary rotation speed.

4. The control device for the engine according to claim 1, wherein when a temperature of a coolant for cooling the engine is lower than a threshold temperature, the control device is configured to select a third rotation speed limit value lower than the first rotation speed limit value, to limit the rotation speed of the engine in a cold state on a basis of the third rotation speed limit value, and to transmit third meter display control information to the meter control device, and the third meter display control information is information for changing the boundary rotation speed from the first boundary rotation speed to a third boundary rotation speed lower than the first boundary rotation speed.

* * * * *